United States Patent Office 3,060,225
Patented Oct. 23, 1962

3,060,225
AMINOPHENYL CARBAMATES
Alexander T. Shulgin, Berkeley, Calif., assignor to The Dow Chemical Company, Midland, Mich., a corporation of Delaware
No Drawing. Filed Nov. 4, 1959, Ser. No. 850,779
9 Claims. (Cl. 260—479)

This invention is directed to carbamate compounds, more particularly to certain m-alkyl-substituted p-aminophenyl and p-alkylaminophenyl methylcarbamates represented by the formulas

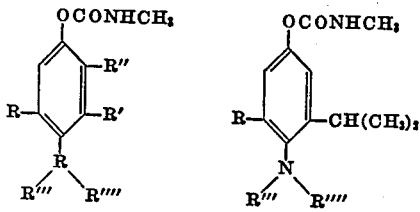

and

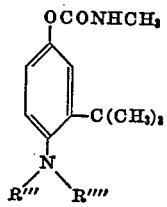

and their hydrochloride salts. In this and succeeding formulas, R and R' are independently selected from the group consisting of methyl and ethyl; R" is selected from the group consisting of hydrogen and methyl, R''' and R'''' are independently selected from the group consisting of hydrogen and alkyl radicals containing from 1 to 5 carbon atoms, inclusive. The invention also relates to methods and compositions for the control of parasitic organisms.

The products of this invention are white or light colored liquids or low-melting solids soluble in solvents such as alcohols, acetone and dimethylformamide and of low solubility in water. Hydrochloride salts of these compounds are water-soluble and water stable.

The compounds of the present invention have many biological applications. These compounds are useful as insecticides showing outstanding activity against chewing insects, aphids and mites. They are further adapted to be employed for the systemic control of insects affecting mammals. They are also useful for the control of trash fish, aquatic pests, mites, helminths and microbes.

The p-alkylaminophenyl methylcarbamate compounds having the structures

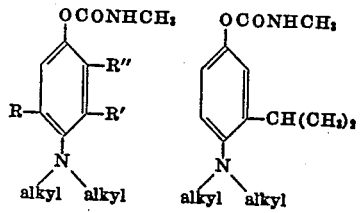

or

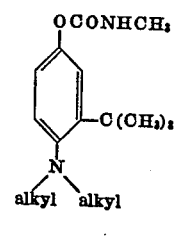

wherein the alkyls are same or different may be prepared by the reaction of an appropriate alkylaminophenol having the structure

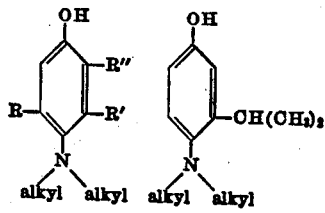

or

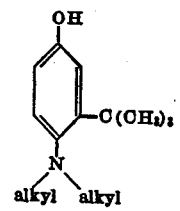

with methyl isocyanate, $CH_3NCO$, to produce the desired compounds.

The p-alkylaminophenyl carbamate compounds having the structure

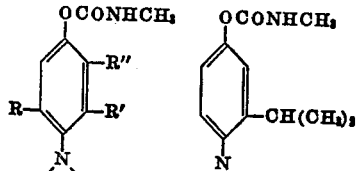

or

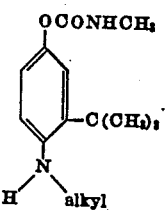

may be prepared by reacting an alkylidene aminophenol

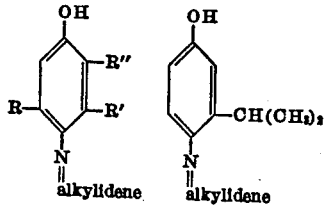

or

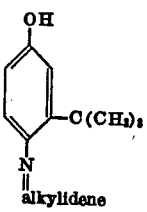

with methyl isocyanate to produce the intermediate

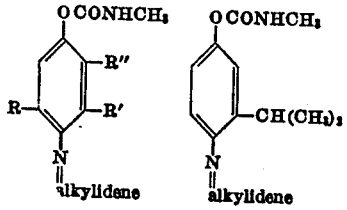

or

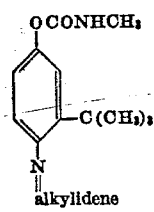
alkylidene and thereafter reducing the intermediate with hydrogen in the presence of palladium catalyst to produce the desired compounds.

The p-aminophenyl methylcarbamate compounds having the structure

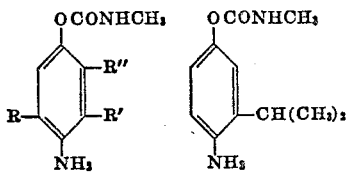

or

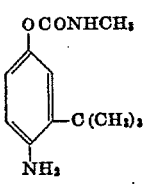

may be prepared by reacting an arylidene aminophenol

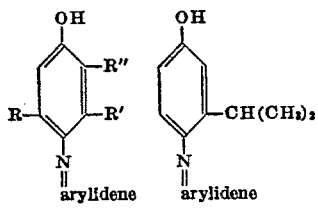

or

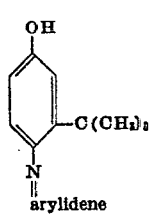
arylidene with methyl isocyanate to produce the intermediate carbamate

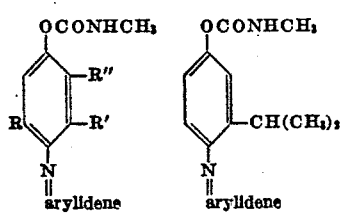

or

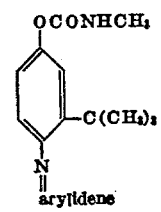
arylidene and thereafter hydrolyzing the latter in the presence of dilute acid to produce the hydrochloride salt of the desired compounds and aromatic aldehyde by-product. The basic p-aminophenyl methylcarbamate may be obtained from the hydrochloride salt by reacting the hydrochloride with an equivalent amount of alkali.

In a preferred method for carrying out the preparation of the p-dialkylaminophenyl methylcarbamates, the appropriate dialkylaminophenol is reacted with a substantially equimolar proportion of methyl isocyanate in an inert solvent and in the presence of a catalytic amount of tertiary amine. Suitable solvents for carrying out the reaction include dimethylformamide, methylene chloride, hexane or triethylamine. Suitable catalysts for the reaction include triethylamine, trimethylamine and pyridine. The reaction takes place in the temperature range of from about 25° to 39° C. After completion of the reaction, the mixture is concentrated by vaporizing the excess solvent and then cooling to precipitate the desired dialkylaminophenyl methylcarbamate product. The latter may be recovered and purified according to conventional procedures.

In a preferred method for carrying out the preparation of p-monoalkylaminophenyl methylcarbamates, the appropriate alkylidene aminophenol is reacted with a substantially equimolar proportion of methyl isocyanate in an inert solvent and in the presence of a catalyst. The conditions for carrying out this step are similar to that set forth above for the preparation of methylcarbamates of p-dialkylaminophenols. The product resulting from these operations is the intermediate alkylidene-aminophenyl methylcarbamate which precipitates in the reaction mixture as a crystalline solid. The latter is recovered by filtration and then hydrogenated in the presence of palladium on charcoal catalyst in methanol or ethanol solvent at a pressure of from 10 to 50 pounds per square inch and a temperature of from 10° to 75° C., to produce the desired monoalkylaminophenyl methylcarbamate product. The latter is recovered from the reaction mixture by filtering off the catalyst, pouring the filtrate into water to precipitate the product as an oil or a solid and recovering the product therefrom by conventional procedures.

In the preferred method for carrying out the preparation of p-(unsubstituted-amino)phenyl methylcarbamates, the appropriate arylidene-aminophenol is reacted with a substantially equimolar proportion of methyl isocyanate in an inert solvent and in the presence of a catalyst. The conditions for carrying out this step are similar to those set forth above for the preparation of p-alkylideneaminophenyl methylcarbamates. As a result of these operations, the arylidene-aminophenyl methylcarbamate intermediate precipitates in the reaction mixture as a crystalline solid or oil. The latter is then hydrolyzed in dilute hydrochloric acid to produce the hydrochloride salt of the desired aminophenyl methylcarbamate. The hydrolysis is conveniently carried out by dissolving the intermediate Schiff base in dilute hydrochloric acid and maintaining the mixture in the temperature range of from about 50° to 60° C. for 30 minutes while stirring. The reaction mixture is then filtered or extracted with a water-immiscible organic solvent to remove the aldehyde by-product. The hydrochloride salt of the aminophenyl methylcarbamate may be recovered from the aqueous solution by vaporizing off the water. Alternatively, the filtrate may be neutralized with aqueous alkali to precipitate the desired aminophenyl methylcarbamate product as a white crystalline solid. The latter may then be recovered by filtration or by extraction with a suitable solvent such as ether and then purified if desired according to conventional procedures.

The hydrochlorides of certain of the aminophenyl methylcarbamates of the present invention may be obtained as described in the preceding paragraph. However, a more general method of preparation of the hydrochlorides is by contacting the aminophenyl methylcarbamates prepared as previously described with an equivalent amount of dilute hydrochloric acid or hydrogen chloride gas to obtain the desired hydrochloride as a white crystalline solid. By dilute acid is meant a concentration no greater than 1 normal.

The preparation of the reactant p-aminophenols is dependent on the particular aminophenol. The aminophenol containing no alkyl substituents on the amino nitrogen $$\text{HO—Ar—NH}_2$$

wherein in this and succeeding formulas —Ar— is

[structures: substituted benzene ring with R, R', R''; benzene ring with —CH(CH₃)₂]

or

[benzene ring with —C(CH₃)₃]

may be prepared according to one of the methods outlined below.

(A) Via an azo-coupling method:
(1) An appropriate phenol in aqueous alkaline solution is reacted with diazotized sulfanilic acid in the temperature range of from —5° C. to 30° C. for from 5 minutes to 12 hours to produce an intermediate azo compound as its sodium salt $$\text{NaO—Ar—H} + {}^+\text{N}{=}\text{N—}\langle\text{C}_6\text{H}_4\rangle\text{—SO}_3{}^- \longrightarrow$$

$$\text{HO—Ar—N}{=}\text{N—}\langle\text{C}_6\text{H}_4\rangle\text{—SO}_3\text{Na}$$

(2) The intermediate sodium salt of the azo compound is reduced by treating with sodium hydrosulfite at a temperature of from about 80° to 90° C. to produce a p-aminophenol.

$$\text{HO—Ar—N}{=}\text{N—}\langle\text{C}_6\text{H}_4\rangle\text{—SO}_3\text{Na} \xrightarrow{\text{Na}_2\text{S}_2\text{O}_4}$$

$$\text{HO—Ar—NH}_2 + \text{H}_2\text{N—}\langle\text{C}_6\text{H}_4\rangle\text{—SO}_3\text{Na}$$

(B) Via a reductive alkylation method:
(1) The appropriate phenol is nitrosated by portionwise addition with stirring of sodium nitrite to a mixture of the phenol and concentrated hydrochloric acid in an appropriate solvent such as ethanol at a temperature of from about —10° to about 20° C., and stirring the resulting mixture for a period of from 0.5 to 20 hours to produce the intermediate p-nitroso derivative of the phenol.

$$\text{HO—Ar—H} + \text{HONO} \rightarrow \text{HO—Ar—NO} + \text{H}_2\text{O}$$

(2) The intermediate p-nitroso derivative of the phenol is reduced by
(a) Treating with alkaline solution of sodium hydrosulfide over a temperature of from 45° to 55° C. for a period of from about 0.5 to about 4 hours, or
(b) Treating with hydrogen with palladium on charcoal catalyst at a pressure of from 10 to 50 pounds per square inch and a temperature of from 10° to 75° C. to produce the desired aminophenol.

$$\text{HO—Ar—NO} \xrightarrow[\text{H}_2,\ \text{Pd—C}]{\text{NaHS}} \text{HO—Ar—NH}_2$$

Symmetrically substituted dialkylaminophenols, $$\begin{array}{c}\text{OH}\\|\\\text{Ar}\\|\\\text{N(alkyl)}_2\end{array}$$

may be prepared according to one of the following methods:

(A) The appropriate p-aminophenol prepared as above described is alkylated with a suitable alkylating agent such as alkyl sulfate in the presence of sodium bicarbonate at a temperature of from about 25° C. to 100° C. for from several minutes to several hours to produce a p-dialkylaminophenol.

$$\text{HO—Ar—NH}_2 + 2(\text{alkyl})_2\text{SO}_4$$
$$+ 2\text{NaHCO}_3 \rightarrow \text{HO—Ar—N(alkyl)}_2$$
$$+ 2\text{Na(alkyl)SO}_4 + 2\text{CO}_2 + 2\text{H}_2\text{O}$$

(B) The appropriate p-nitrosophenol prepared as above described is reductively alkylated with an aliphatic aldehyde and hydrogen in the presence of sodium acetate and palladium on charcoal catalyst at a temperature of from 10° to 75° C. and a pressure of from 10 to 50 pounds per square inch to produce a p-dialkylaminophenol.

$$\text{HO—Ar—NO} \xrightarrow[\text{H}_2,\ \text{Pd—C}]{\text{aldehyde}} \text{HO—Ar—N(alkyl)}_2$$

The monoalkylaminophenols $$\begin{array}{c}\text{OH}\\|\\\text{Ar}\\|\\\text{H—N-alkyl}\end{array}$$

may be prepared as follows:

(1) The p-aminophenol prepared as above described is reacted with a substantially equimolar proportion of an aliphatic aldehyde to prepare an intermediate alkylidene aminophenol $$\text{alkyl}'\text{-CHO} + \text{H}_2\text{N—Ar—OH} \rightarrow \text{alkyl}'\text{-CH}{=}\text{N—ArOH}$$

(2) The intermediate alkylidene aminophenol is hydrogenated over palladium on charcoal at temperatures of from 10° C. to 75° C. and pressures of from 10 to 50 pounds per square inch to produce the desired monoalkylaminophenol $$\text{alkyl}'\text{-CH}{=}\text{N—ArOH} + \text{H}_2 \xrightarrow{\text{PdC}} \text{alkyl}'\text{-CH}_2\text{—NH—Ar—OH}$$

The unsymmetrically substituted dialkylaminophenols $$\begin{array}{c}\text{OH}\\|\\\text{Ar}\\|\\\text{N}\\/\ \ \backslash\\(\text{alkyl})_1\ \ (\text{alkyl})_2\end{array}$$

may be prepared as follows:

The monoalkylaminophenol prepared as above described is reacted with an appropriate aliphatic aldehyde and hydrogen in the presence of palladium on charcoal catalyst at a temperature of from 10° C. to 75° C. and pressure of from 10 to 50 pounds per square inch produce the desired unsymmetrically substituted dialkylaminophenol.

The following are examples illustrating with specific compounds the preparation of the reactants employed in the present invention.

*Example A.—Unsubstituted Aminophenols Via Azo Coupling, 4-Amino-3,5-Xylenol*

A solution of 37.0 grams (0.54 mole) of sodium nitrite in 100 milliliters of water was added quickly with stirring and cooling to a solution of 95.6 grams (0.55 mole) of sulfanilic acid and 26.5 grams (0.25 mole) of anhydrous sodium carbonate in 500 milliliters of water. The resulting mixture was then added quickly with stirring to a slurry of 106 milliliters of concentrated hydrochloric acid and 600 grams of shaved ice and the mixture stirred in an ice bath for 20 minutes while maintaining the temperature below 15° C. to produce a slurry of diazotized sulfanilic acid.

61.0 grams (0.50 mole) of 3,5-xylenol was added to a solution of 100 grams of sodium hydroxide in 600 milliliters of water and 400 grams of ice and cooled to 5° C. An additional 100 milliliters of water was added and to the resulting mixture was added the slurry of diazotized sulfanilic acid prepared as above described and the mixture allowed to stand overnight during which time the temperature of the reaction mixture rose to room temperature. During this period, the sodium salt of the azo coupled 3,5-xylenol formed in the reaction mixture and precipitated as a crystalline solid. The reaction mixture was then heated to 55° C. and 230 grams (2.2 mole) of sodium hydrosulfite added gradually thereto while heating was continued until the temperature reached 85° C. An exothermic reaction then occurred increasing the final temperature to 95° C. with the precipitation of the desired 4-amino-3,5-xylenol as a crystalline solid. The melting point of 4-amino-3,5-xylenol was 178°–180° C.

*Example B.—Unsubstituted Aminophenols Via Reduction of the Nitroso Compound, 4-Amino-3,5-Xylenol*

170 milliliters of concentrated hydrochloric acid was added with stirring and cooling to a solution of 24.4 grams (0.20 mole) of 3,5-xylenol and 160 milliliters of ethanol. The resulting mixture was cooled to about 6° C. and over a period of several minutes 22 grams (0.32 mole) of sodium nitrite added thereto. A reaction started to take place immediately with formation of brown color in the reaction mixture and after about one-half hour, precipitation of a green colored solid started to take place. After about 2 hours, the reaction mixture thickened to the point that stirring became ineffective and the mixture was then poured into water to precipitate the 4-nitroso-3,5-xylenol which was then recovered by filtering the resulting aqueous mixture. The precipitate after washing with water and drying was a light brown solid melting at 183° C. with decomposition.

15.1 grams (0.09 mole) of 4-nitroso-3,5-xylenol prepared as above described and 4.0 grams of sodium hydroxide in 75 milliliters of water was added over a period of 45 minutes to a solution of 10.6 grams (0.19 mole) of sodium hydrosulfide and 0.8 gram of sodium hydroxide in 15 milliliters of water at a temperature of 50° C. The reaction mixture was maintained between 45° and 55° C. for 4 hours and thereafter neutralized with about 13 milliliters of concentrated hydrochloric acid, whereupon a solid precipitated. The mixture was then cooled and filtered and the precipitate dissolved in about 100 milliliters of 1-normal hydrochloric acid at 100° C. The resulting solution was decolorized with charcoal, filtered to remove the charcoal, and the filtrate neutralized to pH of 7.3 to precipitate the desired 4-amino-3,5-xylenol as a light gray solid melting at 175°–177° C.

In an alternative preparation, the reduction was carried out with hydrogen over palladium on charcoal. In a representative operation, 15.1 grams (0.09 mole) of 4-nitroso-3,5-xylenol and 1 gram of 5 percent palladium on charcoal and methanol solvent were mixed together and subjected to low pressure (50 pounds per square inch) hydrogenation. In two hours, the pressure dropped to 35 pounds per square inch with the consumption of 0.2 mole of hydrogen to produce the 4-amino-3,5-xylenol. The latter after recovery by conventional procedures melted at 181°–183° C.

*Example C.—Symmetrical Dialkylamino Phenols, Via Alkylation, 4-Dimethylamino-3,5-Xylenol*

80 grams of sodium bicarbonate and 80 milliliters (0.86 mole) of dimethyl sulfate were added to a solution of 32 grams (0.23 mole) of 4-amino-3,5-xylenol in 117 milliliters of water. An exothermic reaction took place during which time the temperature of the reaction mixture was maintained between 25° and 30° C. with external cooling. The mixture was then allowed to stand overnight at room temperature whereupon the desired 4-dimethylamino-3,5-xylenol precipitated as a white solid. The latter was recovered by filtration, washed with pentane and air-dried to obtain a purified 4-dimethylamino-3,5-xylenol melting from 85° to 92° C.

*Example D.—Symmetrical Dialkylaminophenols Via Reductive Alkylation, 4-Dimethylamino-3,5-Xylenol*

15.1 grams (0.09 mole) of 4-nitroso-3,5-xylenol, 2 grams of sodium acetate and 26 milliliters (0.32 mole) of 37 percent aqueous formaldehyde, and 1.0 gram of 5 percent palladium on charcoal were added to 150 milliliters of methanol. This suspension was subjected to low pressure hydrogenation (50 pounds per square inch) whereupon theoretical hydrogen up-take was achieved in about 2 hours. At the end of this period, catalyst was removed by filtration and the solvent vaporized to obtain as residue a 4-dimethylamino-3,5-xylenol melting from 88° to 92° C.

*Example E.—Alkylidene-Aminophenols, 4-Isobutylideneamino-3,5-Xylenol*

50 grams (0.37 mole) of 4-amino-3,5-xylenol was mixed with 235 milliliters of 50 percent aqueous ethanol and the resulting slurry heated to 50° C. 37 grams (0.51 mole) of isobutyraldehyde was then added with vigorous agitation and the mixing continued for five minutes and the mixture then poured on ice to precipitate the desired 4-isobutylideneamino-3,5-xylenol as a tan solid. The latter was recovered by filtration, washed with water and recrystallized from hexane to obtain a purified 4-isobutylideneamino-3,5-xylenol melting from 107° to 112° C.

*Example F.—Unsymmetrical Dialkylaminophenols, 4-(Normal-Butylmethylamino)-3,5-Xylenol*

18 grams (0.119 mole) of 4-methylamino-3,5-xylenol, 2 grams of 5 percent palladium on charcoal power, 2 grams of sodium acetate trihydrate, 100 milliliters of methanol and 18 milliliters (0.2 mole) of normal-butyraldehyde were placed in the glass bomb of a low pressure hydrogenation apparatus. The air space was purged and a hydrogen pressure of 50 pounds per square inch was established. The bomb was shaken whereupon absorption of hydrogen took place and the reaction was complet in about 1 hour, to produce a 4-(normal-butylmethylamino)-3,5-xylenol. The latter was recovered from the hydrogenation mixture by removing the catalyst by filtration, dilution of the methanol solution with water, extraction with pentane, vaporization of the pentane to recover the product as residue and purifying by distillation. The purified product was a light amber oil boiling for 115° to 118° C. at 2 millimeters of mercury pressure.

The following examples illustrate the present invention but are not to be construed as limiting.

*Example 1.—4-Dimethylamino-3,5-Xylyl Methylcarbamate*

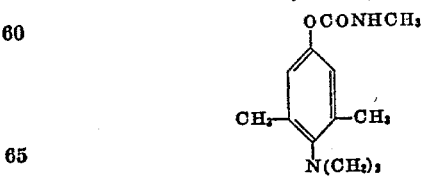

25.5 milliliters (24.6 grams; 0.45 mole) of methyl isocyanate and 5 drops of triethylamine catalyst were added to a solution of 71.5 grams (0.45 mole) of 4-dimethylamino-3,5-dimethyl-phenol (M.P. 85°–92° C.) in 500 milliliters of hexane. The mixture was allowed to react at a temperature of about 35° C. for a period of 8 hours and thereafter concentrated by heating on the steam bath to remove most of the hexane. The mixture was then cooled in an ice bath and seeded with crystals obtained from the reaction mixture to precipitate the desired 4-dimethylamino-3,5-dimethylphenyl methylcarbamate product. The latter was recovered by filtration and found to be a crystalline solid melting from 80° C. to 83° C. (The seed crystals employed in this and subsequent examples were obtained in a conventional manner by vaporizing the solvent from a few drops of reaction mixture and scratching.)

*Example 2.—4-Dimethylamino-3-Ethyl-5-Methyl-Phenyl Methylcarbamate*

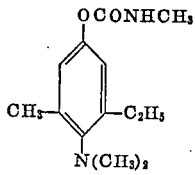

25.5 milliliters (24.6 grams; 0.45 mole) of methyl isocyanate and 5 drops of triethylamine catalyst were added to a solution of 71.5 grams (0.45 mole) of 4-dimethylamino-3-ethyl-5-methylphenol (M.P. 55°–62°) in 500 milliliters of hexane, the mixture allowed to react at a temperature of about 35° C. for about 8 hours, concentrated by vaporizing the hexane to obtain 4-dimethylamino-3-ethyl-5-methyl-phenyl methylcarbamate product as a reddish-gold oily residue. The latter, after purification by threatment with activated charcoal, was a colorless liquid and had a refractive index $n_D^{25}$ of 1.5202.

*Example 3.—4-(Di-Normal-Butylamino)-3,5-Xylyl Methylcarbamate*

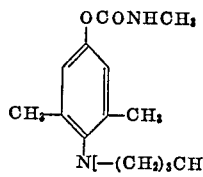

5.5 milliliters (0.097 mole) of methyl isocyanate and 5 drops of triethylamine catalyst were added to a solution of 21 grams (0.085 mole) of 4-di-normal-butylamino-3,5-xylenol in 200 milliliters of pentane and the mixture stirred initially at about 35° C., and allowed to stand over the week-end at room temperature to produce a 4-(di-normal-butylamino)-3,5-xylyl methylcarbamate product. The latter was recovered by cooling to −15° C., filtering off the precipitated product and washing to obtain soft, fluffy white crystals which melted at 59.5°–60° C.

*Example 4.—4-Diethylamino-3,5-Xylyl Methylcarbamate*

In a similar manner 16 milliliters (0.28 mole) of methyl isocyanate and 5 drops of triethylamine catalyst were added to a solution of 45 grams (0.23 mole) of 4-diethylamino 3,5-xylenol in hexane, and the mixture stirred at about 35° C. for 8 hours to produce a 4-diethylamino-3,5-xylyl methylcarbamate product. The latter was recovered by seeding to precipitate the product, filtering the precipitated product and washing to obtain a white waxy solid melting at 62°–63° C.

*Example 5.—4-Diethylamino-3-Ethyl-5-Methylphenyl Methylcarbamate*

In a similar manner, 0.5 milliliter (0.009 mole) of methyl isocyanate and 2 drops of triethylamine catalyst were added to a solution of 1 gram (0.0048 mole) of 4-diethylamino-3-ethyl-5-methylphenol in 10 milliliters of hexane and the mixture stirred at about 35° C. for 8 hours to produce a 4-diethylamino-3-ethyl-5-methylphenyl methylcarbamate product. The latter was recovered as a viscous oil by vaporizing off the solvent. The crude product after purification with activated charcoal was a colorless liquid having a refractive index, $n_D^{25}$ of 1.5153.

*Example 6.—4-(Di-Normal-Propylamino)-3,5-xylyl Methylcarbamate*

In a similar manner, 1.7 milliliters (0.03 mole) of methyl isocyanate and 5 drops of triethylamine catalyst were added to a solution of 4 grams (0.018 mole) of 4-(di-normal-propylamino)-3,5-xylenol in hexane and the mixture allowed to stand overnight to produce a 4-(di-normal-propylamino)-3,5-xylyl methylcarbamate product. The latter was recovered by seeding to precipitate the product, filtering the precipitated products and washing to obtain a white crystalline solid melting from 80° to 82° C.

*Example 7*

In reactions carried out in a manner similar to that above described, the following compounds were prepared:

A 4-(dimethylamino)-2,3,5-trimethylphenyl methylcarbamate product as white crystals having a melting point of 95°–97° C. by the reaction of 4-(dimethylamino)-2,3,5-trimethylphenol and methyl isocyanate in the presence of triethylamine catalyst.

A 4 - (di-isobutylamino)-3,5-xylyl methylcarbamate product as white, fluffy needles having a melting point of 95°–96° C. by the reaction of 4-(di-isobutylamino)-3,5-xylenol and methyl isocyanate in the presence of triethylamine catalyst.

A 4-(di-normal-amylamino)-3,5-xylyl methylcarbamate as a pale yellow oil having a refractive index, $n_D^{25}$ of 1,5033 by the reaction of 4-(di-normal-amylamino)-3,5-xylenol and methyl isocyanate in the presence of triethylamine catalyst.

*Example 8*

In similar reactions the following compounds are prepared:

4-diisopropylamino - 3 - ethyl-5-methyl-phenyl methylcarbamate having a molecular weight of 292 by the reaction of 4-diisopropylamino-3-ethyl-5-methylphenol and methyl isocyanate.

4 - (bis-(2-methylbutyl))amino)-3-ethyl-5-methylphenyl methylcarbamate having a molecular weight of 348 by the reaction of 4-(bis-(2-methylbutyl)amino)-3-ethyl-5-methylphenol and methyl isocyanate.

4-diisoamylamino-3,5-xylyl methylcarbamate having a molecular weight of 334 by the reaction of 4-diisoamylamino-3,5-xylenol and methyl isocyanate.

*Example 9.—3-Tertiary-Butyl-4-Dimethylaminophenyl Methylcarbamate*

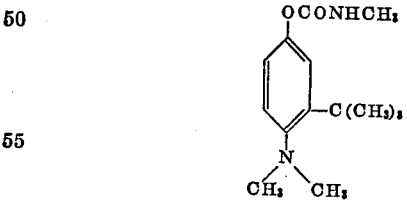

In a manner similar to that previously described, 14.3 milliliters (0.25 mole) of methyl isocyanate and 0.5 milliliters of triethylamine catalyst were added to a solution of 48.3 grams (0.25 mole) of 3-tertiary-butyl-4-dimethylaminophenol in 120 milliliters of methylene dichloride and 240 milliliters of normal-hexane and the mixture stirred initially at about 35° C. and allowed to stand at room temperature overnight to produce a 3-tertiary-butyl-4-dimethylaminophenyl methylcarbamate product which precipitated as a crystalline solid. The latter was recovered by filtration, washed with normal-hexane and air-dried. The yield of the product melting from 120° to 123° C. was 57.5 grams or 92 percent of theoretical.

*Example 10.—3-Isopropyl-4-Dimethylaminophenyl Methylcarbamate*

In a manner similar to that described in Example 9, 4.7 milliliters (0.082 mole) of methyl isocyanate was added at room temperature to a solution of 13 grams (0.073 mole) of 3-isopropyl-4-dimethylaminophenol in 150 milliliters of hexane and 25 milliliters of methylene chloride. To the resulting mixture was added with stirring 5 drops of triethylamine catalyst whereupon the mixture spontaneously warmed to a temperature of about 30° C. The mixture was then allowed to stand at room temperature for about 65 hours and then warmed to evaporate off most of the solvent. To the remaining solution was added pentane to precipitate the desired 3-isopropyl-4-dimethylaminophenyl methylcarbamate product as a white solid. The latter was recovered by filtration and recrystallized from hexane to obtain a purified product melting at 88°–90° C.

*Example 11*

In reactions carried out in a manner similar to that above described the following compounds are prepared:

A 3-tertiary-butyl-4-diethylaminophenyl methylcarbamate product as a white crystalline solid melting at 86°–87° C. by the reaction of 3-tertiary-butyl-4-diethylaminophenol and methyl isocyanate in the presence of triethylamine catalyst.

A 3 - tertiary-butyl-4-(di-normal-propylamino)-phenyl methylcarbamate product as a white solid melting at 82°–84° C. by the reaction of 3-tertiary-butyl-4-(di-normal-propylamino)-phenol and methyl isocyanate in the presence of triethylamine catalyst.

A 3 - tertiary-butyl-4-(di-normal-butylamino)-phenyl methylcarbamate product as a white solid melting from 81° to 83° C. by the reaction of 3-tertiary-butyl-4-(di-normal-butylamino)phenol and methyl isocyanate in the presence of triethylamine catalyst.

3-tertiary-butyl - 4 - diisopropylaminophenyl methylcarbamate having a molecular weight of 306 by the reaction of 3-tertiary-butyl-4-diisopropylaminophenol and methyl isocyanate in the presence of triethylamine catalyst.

3 - tertiary-butyl - 4 - diisoamylaminophenyl methylcarbamate having a molecular weight of 362 by the reaction of 3-tertiary-butyl-4-diisoamylaminophenol and methyl isocyanate in the presence of triethylamine catalyst.

*Example 12.—4-(Methyl-Normal-Butylamino)-3,5-xylyl Methylcarbamate*

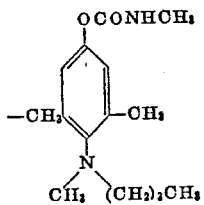

7.4 grams (0.036 mole) of 4-(methyl-normal-butylamino)-3,5-xylenol was dissolved in 50 milliliters of pentane and 2.5 milliliters (0.044 mole) of methyl isocyanate and a few drops of triethylamine catalyst added thereto with stirring. The resulting solution was allowed to stand overnight. The reaction mixture was then heated at 100° and 1 to 2 millimeters of mercury to remove the solvent and unreacted methyl isocyanate to recover as residue a 4-(methyl-normal-butylamino) - 3,5 - xylyl methylcarbamate product as a colorless, viscous oil having a refractive index, $n_D^{25}$ of 1.5135.

*Example 13.—4-(Methyl-Iso-Butylamino)-3,5-Xylyl Methylcarbamate*

In a manner similar to that described in Example 12, 3.1 milliliters (0.055 mole) of methyl isocyanate was added with stirring to a solution of 10 grams (0.048 mole) of 4-(methyl-iso-butylamino)-3,5-xylenol in 50 milliliters of pentane. The reaction mixture was allowed to stand overnight, and the solvent and unreacted methyl isocyanate removed by distillation to produce a 4-(methyl-isobutylamino)-3,5-xylyl methylcarbamate product as a white, crystalline solid. The latter after recrystallization from hexane had a melting point of 105° C. The yield of the product was 12 grams or 94.5 percent of theoretical.

*Example 14.—4-(Methyl-Normal-Amylamino)-3,5-Xylyl Methylcarbamate*

In a similar manner, 3.0 milliliters (0.053 mole) of methyl isocyanate was reacted with 8.5 grams (0.038 mole) of 4-(methyl-normal-amylamino)-3,5-xylenol in pentane solution in the presence of triethylamine catalyst to produce a 4-(methyl-normal-amylamino)-3,5 - xylyl methylcarbamate product as a yellow oil having a refractive index, $n_D^{21}$ of 1.5100. The yield of the product was 10.5 grams or 98 percent of theoretical.

*Example 15.—4-(Ethyl-Iso-Butylamino)-3,5-Xylyl Methylcarbamate*

In a manner similar to that previously described 4-(ethyl-iso-butylamino)-3,5-xylyl methylcarbamate having a refractive index, $n_D^{20}$ of 1.5168 was prepared by the reaction of 14 grams (0.063 mole) of 4-(ethyl-iso-butylamino)-3,5-xylenol and 4.5 milliliters (0.080 mole) of methyl isocyanate in the presence of triethylamine catalyst.

*Example 16*

In similar preparations the following methylcarbamates are prepared:

4-(ethyl-isoamylamino) - 3,5 - xylyl methylcarbamate having a molecular weight of 292 by the reaction of 4-(ethyl-isoamylamino)-3,5-xylenol and methyl isocyanate.

4-(normal-butyl-isopropylamino)-3-ethyl - 5 - methylphenyl methylcarbamate having a molecular weight of 304 by the reaction of 4-(normal-butyl-isopropylamino)-3-ethyl-5-methylphenol and methyl isocyanate.

3-tertiary-butyl-4-(methyl-normal-propylamino)-phenyl methylcarbamate having a molecular weight of 278 by the reaction of 3-tertiary-butyl-4-(methyl-normal-propylamino) phenol and methyl isocyanate.

3-tertiary-butyl-4-(normal-butyl-methylamino) - phenyl methylcarbamate having a molecular weight of 292 by the reaction of 3-tertiary-butyl-4-(normal-butyl-methylamino) phenol and methyl isocyanate.

3-tertiary-butyl-4-(normal-amyl-ethylamino) - phenyl methylcarbamate having a molecular weight of 320 by the reaction of 3-tertiary-butyl-4-(normal-amyl-ethylamino) phenol and methyl isocyanate.

3-tertiary-butyl-4-(secondary-butyl - isopropylamino)-phenyl methylcarbamate having a molecular weight of 320 by the reaction of 3-tertiary-butyl-4-(secondary-butyl-isopropylamino)phenol and methyl isocyanate.

3-isopropyl-4-(methyl - normal - propylamino)phenyl methylcarbamate having a molecular weight of 264 by the reaction of 3 - isopropyl-4-(methyl-normal-propylamino) phenol and methyl isocyanate.

3-isopropyl-4-(normal-butyl-ethylamino)phenyl - methylcarbamate having a molecular weight of 292 by the reaction of 3 - isopropyl-4-(normal-butyl-methylamino) phenol and methyl isocyanate.

3-isopropyl-4-(normal-hexyl-ethylamino)phenyl methylcarbamate having a molecular weight of 320 by the reaction of 3 - isopropyl-4-(normal-amyl-ethylamino)phenol and methyl isocyanate.

3 - isopropyl - 4 - (secondary - butyl - isopropylamino) phenyl methylcarbamate having a molecular weight of 306 by the reaction of 3-isopropyl-4-(secondary-butyl-isopropyl-amino)phenol and methyl isocyanate.

Example 17.—4-Amino-3-Tertiary-Butylphenyl Methylcarbamate

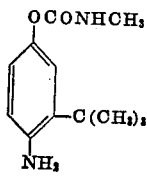

5.3 milliliters (0.094 mole) of methyl isocyanate and 5 drops of triethylamine were added to a solution of 22.0 grams (0.087 mole) of 4-benzylidene-3-tertiary-butylphenol in 30 milliliters of methylene chloride and 100 milliliters of normal hexane. The resulting mixture was warmed to 35° C. and then allowed to stand overnight at room temperature to obtain a 4-benzylideneamino-3-tertiary-butylphenyl methylcarbamate intermediate as a yellow crystalline solid which precipitated in the reaction mixture. The latter was recovered by filtration and recrystallized from ethanol-water to obtain a purified intermediate product melting from 109° to 111° C.

10 grams (0.032 mole) of the 4-benzylideneamino-3-tertiary-butylphenyl methylcarbamate intermediate prepared as above described was added with stirring to 600 milliliters of 0.5 normal hydrochloric acid held at 50°–60° C. and maintained at this temperature with continued agitation for 30 minutes. As a result of this operation, a reaction took place with the formation of a 4-amino-3-tertiary-butylphenyl methylcarbamate·hydrochloride having a molecular weight of 222 and benzaldehyde by-product. The reaction mixture which contained some unreacted starting material as a solid was filtered to remove same and the filtrate extracted with diethyl ether to remove the benzaldehyde by-product. The remaining aqueous acid solution was neutralized with about 35 milliliters of 25 percent sodium hydroxide to precipitate the desired 4-amino-3-tertiary-butylphenyl methylcarbamate product as a white solid. The latter was recovered by filtration and dried. The melting point of the product was 161°–162° C.

Example 18.—4-Amino-3,5-Xylyl Methylcarbamate

In a manner similar to that described in Example 17, a 4-benzylideneamino-3,5-xylyl methylcarbamate intermediate was prepared from 2.8 milliliters (0.049 mole) of methyl isocyanate and 10.0 grams (0.044 mole) of 4-benzylideneamine-3,5-xylenol in the presence of a few drops of triethylamine catalyst.

1.8 grams (0.0064 mole) of the 4-benzylideneamino-3,5-xylyl methylcarbamate was hydrolyzed in 75 milliliters of 1.0 normal hydrochloric acid in a manner similar to that above described to produce a 4-amino-3,5-xylyl methylcarbamate·hydrochloride having a molecular weight of 194 and benzaldehyde by-product. The reaction mixture was extracted with diethyl ether, and neutralized with an aqueous solution of sodium bicarbonate to obtain a 4-amino-3,5-xylyl methylcarbamate product as a white solid. After recovery and drying, the product melted at 108°–110° C.

Example 19

In a manner similar to that set forth in Examples 17 and 18, 4-amino-3-ethyl-5-methylphenyl methylcarbamate having a molecular weight of 208 is prepared by the reaction of 4-benzylidene-3-ethyl-5-methylphenol and methyl isocyanate to produce the intermediate 4-benzylidene-3-ethyl-5-methylphenyl carbamate followed by the hydrolysis of the latter with dilute hydrochloric acid.

Example 20.—4-Iso-Butylamino-3,5-Xylyl Methylcarbamate

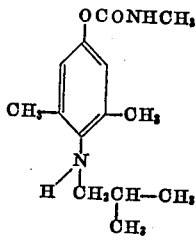

30 grams (0.157 mole) of 4-iso-butylideneamino-3,5-xylenol and 17 grams (0.30 mole) of methyl isocyanate were reacted in the presence of triethylamine in a manner similar to that previously described.

Six grams (0.024 mole) of 4-iso-butylideneamino-3,5-xylyl methylcarbamate, (M.P. 80–83° C.), 1.5 grams of 5 percent palladium on charcoal powder and 150 milliliters of methanol were placed in the bomb of a low pressure hydrogenation apparatus. The air was purged with hydrogen and an initial pressure of 50 pounds per square inch of hydrogen was established. The shaker was turned on and hydrogen was absorbed immediately to produce a 4-iso-butylamino-3,5-xylyl methylcarbamate product. The theoretical amount of hydrogen was absorbed in about 5 minutes. After an additional 15 minutes, the shaker was stopped and the hydrogen pressure released. The catalyst was filtered off to produce a colorless filtrate. The solvent was removed by distillation at 50° and 20 millimeters of mercury pressure to recover the product as a white solid residue. The latter after recrystallization from hexane melted from 97° to 99° C.

Example 21.—4-Isopropylamino-3,5-Xylyl Methylcarbamate

One gram (0.0056 mole) of 4-isopropylamino-3,5-xylenol was dissolved in 75 milliliters of methylene chloride and 0.3 milliliter (0.0054 mole) of methyl isocyanate and a few drops of triethylamine catalyst added thereto. The reaction mixture was allowed to stand overnight to produce a 4-isopropylamino-3,5-xylyl methylcarbamate product. The latter was recovered from the reaction mixture as a white crystalline solid residue. The latter after recrystallization from cyclo-hexane melted from 68° to 74° C. The yield of the product was 1 gram or 75 percent of theoretical. The product had a nitrogen content of 11.86 percent. The theoretical value is 12.01 percent.

Example 22

In preparations carried out as described in Example 20, the following methylcarbamates are prepared:

3-ethyl-5-methyl-4-methylaminophenyl methylcarbamate having a molecular weight of 222 by the reaction of 3-ethyl-5-methyl-4-methylideneaminophenol and methyl isocyanate to produce an intermediate 3-ethyl-5-methyl-4-methylideneaminophenyl methylcarbamate followed by hydrogenation of the latter over palladium on charcoal.

4-ethylamino-3,5-xylyl methylcarbamate having a molecular weight of 222 by the reaction of 4-ethylideneamino-3,5-xylenol and methyl isocyanate to produce an intermediate 4-ethylideneamino-3,5-xylyl methylcarbamate followed by hydrogenation of the latter over palladium on charcoal.

4-(2-methylbutylamino)-3,5-xylyl methylcarbamate having a molecular weight of 264 by the reaction of 4-(2-methylbutylideneamino)-3,5-xylenol and methyl isocyanate to produce an intermediate 4-(2-methylbutylideneamino)-3,5-xylyl methylcarbamate followed by hydrogenation of the latter over palladium on charcoal.

3-tertiary-butyl-4-methylaminophenyl methylcarbamate having a molecular weight of 236 by the reaction of 3-tertiary-butyl-4-methylideneaminophenol and methyl isocyanate to produce an intermediate 3-tertiary-butyl-4- methylideneamino-phenyl methylcarbamate followed by hydrogenation of the latter over palladium on charcoal.

3-tertiary-butyl-4 - isopropylaminophenyl methylcarbamate having a molecular weight of 263 by the reaction of 3-tertiary-butyl - 4 - isopropylideneaminophenol and of methyl isocyanate to produce an intermediate 3-tertiary-butyl-4-isopropylideneaminophenyl methylcarbamate followed by hydrogenation of the latter over palladium on charcoal.

3-isopropyl-4-(normal-butylamino)phenyl methylcarbamate having a molecular weight of 264 by the reaction of 3-isopropyl - 4 - (normal - butylideneamino)phenol and methyl isocyanate to produce an intermediate 3-isopropyl-4-(normal-butylideneamino)phenyl methylcarbamate followed by hydrogenation of the latter over palladium on charcoal.

3-isopropyl-4-(normal-amylamino)phenyl methylcarbamate having a molecular weight of 278 by the reaction of 3-isopropyl - 4 - pentylideneaminophenol and methyl isocyanate to produce an intermediate 3-isopropyl-4-pentylideneamino-phenyl methylcarbamate followed by hydrogenation of the latter over palladium on charcoal.

*Example 23.—3-Tertiary-Butyl-4-Dimethylaminophenyl Methylcarbamate·Hydrochloride*

2.50 grams (0.01 mole) of 3-tertiary-butyl-4-dimethylaminophenol was dissolved in 10 milliliters of 1.0 normal hydrochloric acid to produce a purple solution. The latter was decolorized at room temperature with activated charcoal and the resulting nearly colorless solution was cooled in a round-bottomed flask until frozen on the walls and subjected to reduced pressure to remove the water by sublimation and to recover as residue the desired 3-tertiary-butyl - 4 - dimethylaminophenyl methylcarbamate·hydrochloride product which after drying at 100° C. melted at 219°–221° C. with decomposition.

*Example 24*

In a similar manner, the following hydrochlorides are prepared:

4-(dimethylamino)-3,5-xylyl methylcarbamate·hydrochloride, molecular weight of 258.5.

3-tertiary-butyl - 4 - (di-normal-butylamino) - phenyl methylcarbamate·hydrochloride, molecular weight of 370.5.

4-(methyl-normal-butylamino) - 3,5 - xylyl methylcarbamate·hydrochloride, molecular weight of 300.5.

4-(secondary-butylamino)-3,5-xylyl methylcarbamate·hydrochloride, molecular weight of 285.5.

The compounds of the present invention are useful as parasiticides in a variety of household, industrial and agricultural operations. Thus, they are useful for the control of various water pests such as trash fish, snails and entomostracans. In representative operations for the control of entomostracans, complete controls of Daphnia sp., Cyclops sp. and Eubranchipus were obtained when these aquatic pests in aqueous media were separately exposed to 4-dimethylamino-3,5-xylyl methylcarbamate at a concentration of 1 part by weight per million parts by weight of medium for 24 hours.

They have also been found to be useful in animal husbandry against pests attacking mammals such as ticks and lice. They are further useful for oral or parenteral administration to warm-blooded animals as systemic insecticides for the control of various species of cattle grub, screw-worms and stable flies, as well as for the control of helminths.

They may also be employed for the control of household and industrial pests including house flies, cockroaches and confused flour beetles.

It has been discovered that the new aminophenyl methylcarbamates are extremely effective for the control of many parasitic organisms, particularly those found on the aerial portions of growing plants inclusive of aphids, mites, plant pathogens and insects. These compounds have outstanding activity against chewing type insects as represented by Mexican bean beetle (*Epilachna varivestis*) and Southern army worm (*Prodenia eridania*). These compounds are effective against chewing type insects at a low concentration heretofore not believed effective with any known insecticide. Compositions comprising the aminophenyl methylcarbamates as an active ingredient in association with various carriers, surface active agents and other additaments are very useful for the control of these undesirable pests. It is an advantage of the present invention that compositions containing the compounds may be applied to growing vegetation in amounts required for pest control without significant injury to plant foliage.

In carrying out the method of the present invention, the undesirable pests may be controlled by contacting the organism, its habitat, and/or its food prior to ingestion with a parasiticidal amount of the unmodified methylcarbamate product. However, the present method also embraces the employment of a liquid or dust composition containing the toxicant. Such compositions are adapted to be applied to living plants without substantial injury to the foliage thereof. In preparing toxicant compositions, the methylcarbamate product may be modified with one or more of a plurality of additaments including aromatic solvents, petroleum distillates, water liquid carriers, surface active dispersing agents and finely divided inert solids. Depending upon the concentration in the composition of the methylcarbamate product, such augmented compositions are adapted to be employed for the control of undesirable parasites or employed as concentrates and subsequently diluted with additional inert carrier to produce the ultimate treating compositions. In compositions to be employed as concentrates, the toxicant may be present in a concentration of from about 5 to 95 percent by weight.

The exact concentration of the methylcarbamate product employed in a composition for application to the pest, its habitat or food, may vary provided a parasiticidal dosage of toxicant is supplied either on the organism or its environment, or in its food. This dosage of toxicant is primarily dependent upon the susceptibility of a particular organism to the methylcarbamate product. Good results are obtained with liquid compositions containing as little as 1.5 parts by weight of the toxicant per million parts by weight of composition to about 1–2 percent by weight, although compositions containing as high as 90 percent may be employed. With dusts, good results are obtained with compositions containing from 0.1 to 10 percent or more by weight of toxicant.

In the preparation of dust compositions, the methylcarbamate product may be compounded with any of the finely divided solids such as pyrophyllite, diatomaceous earth, gypsum and the like. In such operations, the finely divided carrier is ground or mixed with the toxicant or wet with a solution of the toxicant in a volatile organic solvent. Similarly, dust compositions containing the methylcarbamate product may be similarly compounded from various of the solid surface active dispersing agents, such as fuller's earth, attapulgite and other clays. Depending upon the proportions of ingredients, these dust compositions may be employed as concentrates and subsequently diluted with additional solid surface active dispersing agent or with pyrophyllite, diatomaceous earth, gypsum and the like to obtain the desired amount of active ingredient in a composition adapted to be employed for the control of pests. Also, such concentrate dust compositions may be dispersed in water, with or without the aid of dispersing agents, to form spray mixtures.

Further, the methylcarbamate product or a dust concentrate composition containing such product may be incorporated in intimate mixture with surface active dispersing agents such as ionic and non-ionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

Similarly, the methylcarbamate product may be compounded with a suitable water-immiscible organic liquid and surface active dispersing agent to produce emulsifiable liquid concentrates which may be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents to be employed in these compositions are oil-soluble and include the non-ionic emulsifiers such as the organic acids, polyoxyethylene derivatives of sorbitan esters, complex ether alcohols and the like. However, oil-soluble ionic emulsifying agents such as mahogany soaps may also be used. Suitable organic liquids to be employed in the compositions include petroleum oils and distillates, toluene, liquid halohydrocarbons and synthetic organic oils.

When operating in accordance with the present invention, the methylcarbamate product or a composition containing the toxicant may be applied to the pests to be controlled, to their habitat or to their food in any convenient fashion, e.g., by means of hand dusters or sprayers or by simple mixing with the food to be ingested by the organisms. Applications to the foilage of plants conveniently may be carried out with power dusters, boom sprayers and spray dusters. In such foliar applications, the employed compositions should not contain any appreciable amounts of any phytotoxic diluents. In large scale operations, dusts or low-volume sprays may be applied from an airplane.

The control of parasitic organisms by the administration of the new aminophenyl methylcarbamates is illustrated by the following examples.

*Example 25*

In separate operations, concentrate compositions of aminophenyl methylcarbamates having the formulas and are prepared as follows:

Twenty-five parts by weight of an aminophenyl methylcarbamate, 65 parts of xylene and 10 parts of an alkylated aryl polyether alcohol are mechanically mixed together to prepare an emulsifiable concentrate composition.

In a similar manner, 90 parts by weight of an aminophenyl methylcarbamate and 10 parts by weight of a sorbitan monolaurate polyoxyethylene derivative (Tween 20) are mixed to prepare a water-dispersible concentrate.

Also, 25 parts by weight of an aminophenyl methylcarbamate, 10 parts of diatomaceous earth, 2 parts of an alkyl aryl sulfonate (Nacconol NR) and 1 part of a polymerized sodium salt of substituted benzoid alkyl sulfonic acids (Daxad No. 27) are mechanically mixed and ground together to prepare a concentrate composition in the form of a wettable powder.

These concentrate compositions are dispersed in water to provide aqueous compositions which have very desirable wetting properties. The latter aqueous compositions are applied to such undesirable pests as aphids, mites, chewing insects, and plant pathogens or to their habitats and food for the control of the organisms.

*Example 26*

In separate operations, treating compositions containing 4-dimethylamino-3,5-xylyl methylcarbamate, 3-ethyl-5-methyl-4-dimethylaminophenyl methylcarbamate, 4-(normal-butyl-methylamino)-3,5-xylyl methylcarbamate, 3-tertiary-butyl-4-dimethylaminophenyl methylcarbamate and 4-isobutylamino-3,5-xylyl methylcarbamate were prepared by ballmilling together 0.1 part by weight of the methylcarbamate, 0.15 part of Nacconol NR, 0.15 part of Daxad No. 27 and 500 parts of water. The resulting compositions were further diluted with water to produce aqueous spray treating compositions containing 25 parts per million by weight of one of the methylcarbamates per million parts by weight of ultimate spray mixture. These compositions were separately applied to a series of cranberry bean plants in amounts sufficient to wet the foliage. The leaf surfaces were then allowed to dry and the plants then infested with a known number of Southern army worm (*Prodenia eridania*) larvae. Three days after infestation, the plants were examined to ascertain the control of Southern army worms attributable to the test compounds. It was found that in all cases complete kills of Southern army worm larvae were observed.

Those compounds having the structure and their hydrochloride salts are, in addition, useful as antimicrobial agents and are adapted to be employed as toxicant in germicidal and disinfectant compositions. Thus, they may be employed to inhibit the growth of bacteria and fungi as represented by such species as *Staphylococcus aureus, Salmonella typhosa, Aerobacter aerogenes, Erwinia carotovora, Aspergillus terreus, Pullularia pullulans, Penicillium digitatum* and *Rhizopus nigricans.* In representative operations for the control of bacteria and fungi, agar medium containing 0.05 percent by weight of 4-dimethylamino-3,5-xylyl methylcarbamate were plated in Petri dishes and in separate operations streaked with *S. aureus, E. carotovora, P. pullulans,* and *P. digitatum* and incubated for 3 days at 30° C. Examination of the plates at the end of this period showed complete inhibition of growth of the test organisms.

I claim:

1. An aminophenyl methylcarbamate selected from the group having the formulas and

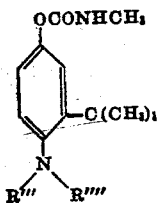

wherein R and R' are independently selected from the group consising of methyl and ethyl, R" is selected from the group consisting of hydrogen and methyl, R'" and R"" are independently selected from the group consisting of hydrogen and lower alkyl containing from 1 to 5 carbon atoms, inclusive, and their hydrochloride salts.

2. 4-dimethylamino-3,5-xylyl methylcarbamate.
3. 4-diethylamino-3,5-xylyl methylcarbamate.
4. 4-di-normal-propylamino-3,5-xylyl methylcarbamate.
5. 4-di-normal-butylamino-3,5-xylyl methylcarbamate.
6. 4-dimethylamino-3-tertiary-butylphenyl methylcarbamate.
7. 4-diethylamino-3-tertiary-butylphenyl methylcarbamate.
8. 4-diethylamino-3-ethyl-5-methylphenyl methylcarbamate.
9. 4-dimethylamino-2,3,5-trimethylphenyl methylcarbamate.

References Cited in the file of this patent

UNITED STATES PATENTS

| | | |
|---|---|---|
| 2,362,508 | Stevens et al. | Nov. 14, 1944 |
| 2,493,710 | Aeschlimann et al. | Jan. 3, 1950 |
| 2,843,519 | Fitch | July 15, 1958 |
| 2,854,374 | Huismann et al. | Sept. 30, 1958 |

OTHER REFERENCES

Stedman, Biochemical Journal, vol. 20, No. 4, 1926, pp. 719–734.

Wheatley et al., J.A.C.S, vol. 79, Feb. 5, 1957, pp. 747–749.

Kolbezen et al., J. Agr. and Food Chem., vol. 2, No. 17, Aug. 18, 1954, pp. 864–70.

UNITED STATES PATENT OFFICE
CERTIFICATE OF CORRECTION

Patent No. 3,060,225                        October 23, 1962

Alexander T. Shulgin

It is hereby certified that error appears in the above numbered patent requiring correction and that the said Letters Patent should read as corrected below.

Column 1, lines 12 to 20, the formulas should appear as shown below instead of as in the patent:

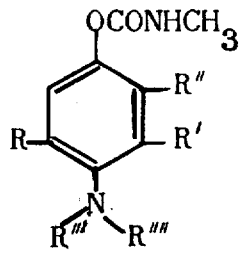 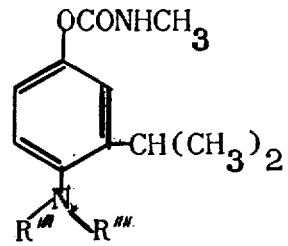

column 5, line 74, for the left-hand portion reading "HO-Aa-NO" read -- HO-Ar-NO --.

Signed and sealed this 25th day of June 1963.

(SEAL)
Attest:

ERNEST W. SWIDER

Attesting Officer

DAVID L. LADD

Commissioner of Patent